(12) United States Patent
Kishi et al.

(10) Patent No.: US 10,698,398 B2
(45) Date of Patent: Jun. 30, 2020

(54) ALARM DISPLAY SYSTEM AND ALARM DISPLAY METHOD

(71) Applicant: Mitsubishi Hitachi Power Systems, Ltd., Kanagawa (JP)

(72) Inventors: Makoto Kishi, Tokyo (JP); Satoru Mori, Tokyo (JP); Yuki Nakazawa, Tokyo (JP); Toru Tanaka, Yokohama (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 0 days.

(21) Appl. No.: 16/469,994

(22) PCT Filed: Jan. 26, 2018

(86) PCT No.: PCT/JP2018/002506
§ 371 (c)(1),
(2) Date: Jun. 14, 2019

(87) PCT Pub. No.: WO2018/139586
PCT Pub. Date: Aug. 2, 2018

(65) Prior Publication Data
US 2020/0096984 A1 Mar. 26, 2020

(30) Foreign Application Priority Data
Jan. 26, 2017 (JP) .................................. 2017-011983

(51) Int. Cl.
*G05B 23/02* (2006.01)
(52) U.S. Cl.
CPC ..... *G05B 23/0272* (2013.01); *G05B 23/0232* (2013.01)
(58) Field of Classification Search
CPC .............. G05B 23/0232; G05B 23/027; G05B 23/272; G06Q 10/06
See application file for complete search history.

(56) References Cited

U.S. PATENT DOCUMENTS

2009/0288165 A1* 11/2009 Qiu ................... G06F 21/552
726/23
2013/0297049 A1* 11/2013 Morita ................ G05B 23/027
700/80
(Continued)

FOREIGN PATENT DOCUMENTS

JP     57-083808    5/1982
JP     63-135402    9/1988
(Continued)

OTHER PUBLICATIONS

International Search Report dated Mar. 20, 2018 in International (PCT) Application No. PCT/JP2018/002506 with English translation.
(Continued)

*Primary Examiner* — Hoi C Lau
(74) *Attorney, Agent, or Firm* — Wenderoth, Lind & Ponack, L.L.P.

(57) ABSTRACT

An alarm display system includes: a database configured to store a plurality of sets of predetermined events, occurrence probabilities of the events, checking situations of the events, and countermeasure policies of the events in association with the sets; an alarm information acquisition unit configured to acquire alarm information indicating that the events occur in monitoring target devices; a support information addition unit configured to add support information for supporting determination of a countermeasure for the alarm information according to information stored in the database, to the acquired alarm information; and a display unit configured to display alarm display information in which the support information is added.

10 Claims, 8 Drawing Sheets

(56) References Cited

U.S. PATENT DOCUMENTS

| | | | | |
|---|---|---|---|---|
| 2015/0081673 A1* | 3/2015 | Kaneko | ............ | H04N 21/44222 |
| | | | | 707/722 |
| 2015/0160630 A1* | 6/2015 | Makishima | ............. | H04L 67/10 |
| | | | | 700/12 |
| 2015/0323921 A1* | 11/2015 | Saito | ...................... | G06Q 10/06 |
| | | | | 700/291 |
| 2018/0315301 A1* | 11/2018 | Subramanian | ....... | G06K 9/6278 |
| 2020/0096984 A1* | 3/2020 | Kishi | ................. | G05B 23/0232 |

FOREIGN PATENT DOCUMENTS

| | | |
|---|---|---|
| JP | 10-340121 | 12/1998 |
| JP | 11-231928 | 8/1999 |
| JP | 2000-270430 | 9/2000 |
| JP | 2005-031820 | 2/2005 |
| JP | 2013-182547 | 9/2013 |
| JP | 2015-114778 | 6/2015 |
| JP | 2017-010155 | 1/2017 |
| WO | 2014/008941 | 1/2014 |

OTHER PUBLICATIONS

Written Opinion of the International Searching Authority dated Mar. 20, 2018 in International (PCT) Application No. PCT/JP2018/002506 with English translation.

* cited by examiner

FIG. 2

| | F11 | F12 | F13 | F14 |
|---|---|---|---|---|
| | ALARM NAME | OCCURRENCE PROBABILITY | CHECKING SITUATION | WHETHER CHECKING IS NECESSARY EVERY TIME |
| R11 | ALARM A | 80% | NO GAUGE CORRECTION. NO IMMEDIATE INFLUENCE ON RUNNING. | UNNECESSARY |
| R12 | ALARM B | 20% | DEPENDS ON PUMP STATE. CHECKING OF DEVICE STATE NECESSARY. | NECESSARY |
| R13 | ALARM C | 20% | NO LOGIC SETTING. NO IMMEDIATE INFLUENCE ON RUNNING. | UNNECESSARY |
| | ... | ... | ... | ... |

| TIME | ALARM NAME | OCCURRENCE PROBABILITY | CHECKING SITUATION | WHETHER CHECKING IS NECESSARY EVERY TIME | |
|---|---|---|---|---|---|
| 2016/8/20 00:35 | ALARM A | 80% | NO GAUGE CORRECTION. NO IMMEDIATE INFLUENCE ON RUNNING. | UNNECESSARY | ← 701 |
| 2016/8/20 00:15 | ALARM A | 80% | NO GAUGE CORRECTION. NO IMMEDIATE INFLUENCE ON RUNNING. | UNNECESSARY | ← 702 |
| 2016/8/19 23:25 | ALARM B | 20% | DEPENDS ON PUMP STATE. CHECKING OF DEVICE STATE NECESSARY. | NECESSARY | ← 703 |
| 2016/8/19 22:25 | ALARM C | 20% | NO LOGIC SETTING. NO IMMEDIATE INFLUENCE ON RUNNING. | UNNECESSARY | ← 704 |
| 2016/8/19 22:20 | ALARM A | 80% | NO GAUGE CORRECTION. NO IMMEDIATE INFLUENCE ON RUNNING. | UNNECESSARY | ← 705 |
| 2016/8/19 22:15 | ALARM C | 20% | NO LOGIC SETTING. NO IMMEDIATE INFLUENCE ON RUNNING. | UNNECESSARY | ← 706 |
| 2016/8/19 08:25 | ALARM A | 80% | NO GAUGE CORRECTION. NO IMMEDIATE INFLUENCE ON RUNNING. | UNNECESSARY | ← 707 |
| 2016/8/18 22:25 | ALARM C | 20% | NO LOGIC SETTING. NO IMMEDIATE INFLUENCE ON RUNNING. | UNNECESSARY | ← 708 |
| 2016/8/18 22:20 | ALARM A | 80% | NO GAUGE CORRECTION. NO IMMEDIATE INFLUENCE ON RUNNING. | UNNECESSARY | ← 709 |
| 2016/8/18 22:15 | ALARM B | 20% | DEPENDS ON PUMP STATE. CHECKING OF DEVICE STATE NECESSARY. | NECESSARY | ← 710 |
| 2016/8/18 22:10 | ALARM A | 80% | NO GAUGE CORRECTION. NO IMMEDIATE INFLUENCE ON RUNNING. | UNNECESSARY | ← 711 |
| ... | ... | ... | ... | ... | |

FIG. 5

| TIME | ALARM NAME | OCCURRENCE PROBABILITY | CHECKING SITUATION |
|---|---|---|---|
| 2016/8/20 00:35 | ALARM A | 80% | NO GAUGE CORRECTION. NO IMMEDIATE INFLUENCE ON RUNNING. |
| 2016/8/20 00:15 | ALARM A | 80% | NO GAUGE CORRECTION. NO IMMEDIATE INFLUENCE ON RUNNING. |
| 2016/8/19 23:25 | ALARM B | 20% | DEPENDS ON PUMP STATE. CHECKING OF DEVICE STATE NECESSARY. |
| 2016/8/19 22:25 | ALARM C | 20% | NO LOGIC SETTING. NO IMMEDIATE INFLUENCE ON RUNNING. |
| 2016/8/19 22:20 | ALARM A | 80% | NO GAUGE CORRECTION. NO IMMEDIATE INFLUENCE ON RUNNING. |
| 2016/8/19 22:15 | ALARM C | 20% | NO LOGIC SETTING. NO IMMEDIATE INFLUENCE ON RUNNING. |
| 2016/8/19 08:25 | ALARM A | 80% | NO GAUGE CORRECTION. NO IMMEDIATE INFLUENCE ON RUNNING. |
| 2016/8/18 22:25 | ALARM C | 20% | NO LOGIC SETTING. NO IMMEDIATE INFLUENCE ON RUNNING. |
| 2016/8/18 22:20 | ALARM A | 80% | NO GAUGE CORRECTION. NO IMMEDIATE INFLUENCE ON RUNNING. |
| 2016/8/18 22:15 | ALARM B | 20% | DEPENDS ON PUMP STATE. CHECKING OF DEVICE STATE NECESSARY. |
| 2016/8/18 22:10 | ALARM A | 80% | NO GAUGE CORRECTION. NO IMMEDIATE INFLUENCE ON RUNNING. |
| ... | ... | ... | ... |

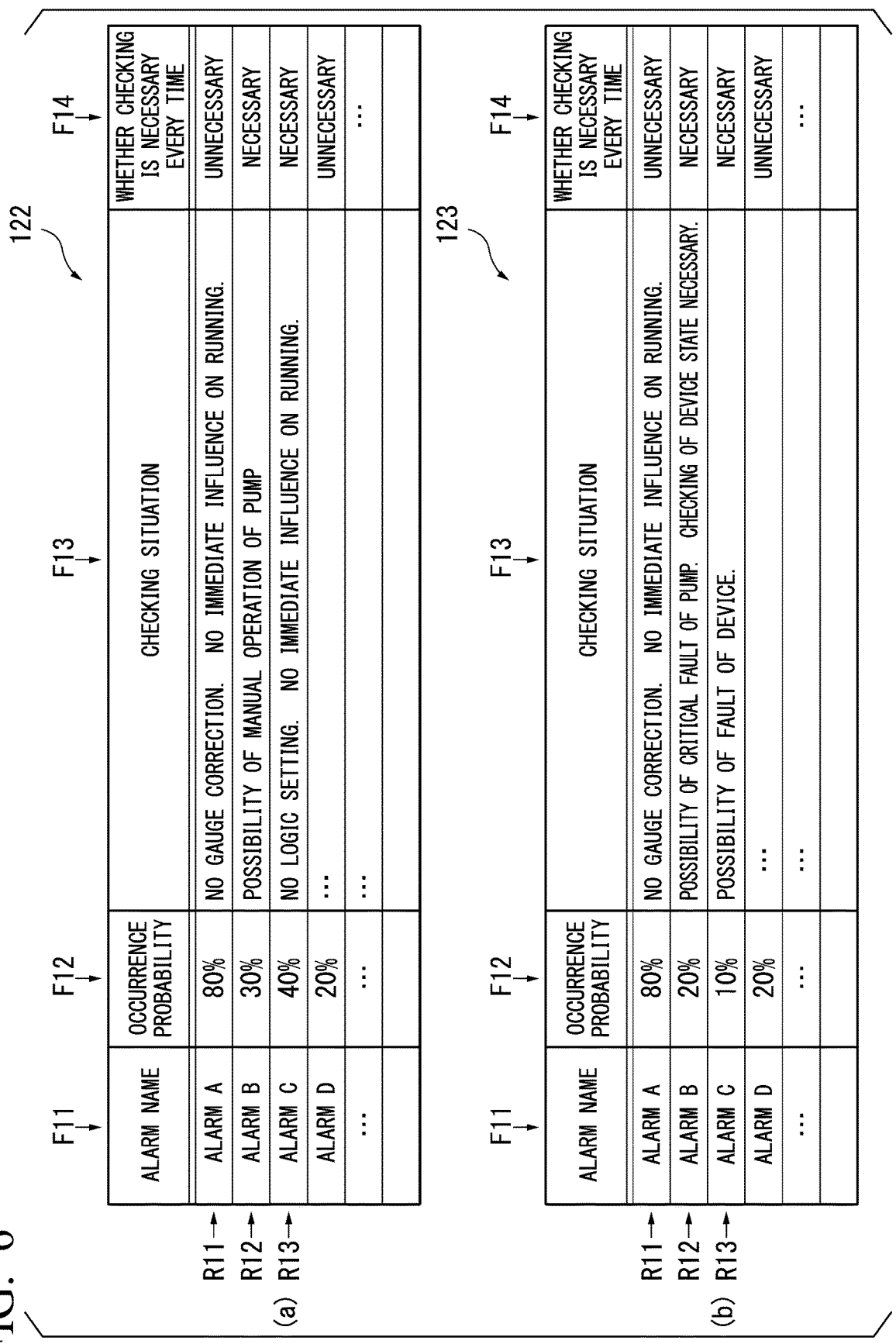

FIG. 8

| TIME | ALARM NAME | OCCURRENCE PROBABILITY | CHECKING SITUATION | WHETHER CHECKING IS NECESSARY EVERY TIME | |
|---|---|---|---|---|---|
| 2016/8/20 00:35 | ALARM A | 80% | NO GAUGE CORRECTION. NO IMMEDIATE INFLUENCE ON RUNNING. | UNNECESSARY | ~741 |
| 2016/8/20 00:15 | ALARM A | 80% | NO GAUGE CORRECTION. NO IMMEDIATE INFLUENCE ON RUNNING. | UNNECESSARY | ~742 |
| 2016/8/19 23:25 | ALARM B | 30% | POSSIBILITY OF MANUAL OPERATION OF PUMP | NECESSARY | ~743 |
| 2016/8/19 22:25 | ALARM C | 40% | NO LOGIC SETTING. NO IMMEDIATE INFLUENCE ON RUNNING. | NECESSARY | ~744 |
| 2016/8/19 22:20 | ALARM A | 80% | NO GAUGE CORRECTION. NO IMMEDIATE INFLUENCE ON RUNNING. | UNNECESSARY | ~745 |
| 2016/8/19 22:15 | ALARM C | 10% | POSSIBILITY OF FAULT OF DEVICE. | NECESSARY | ~746 |
| 2016/8/19 08:25 | ALARM A | 80% | NO GAUGE CORRECTION. NO IMMEDIATE INFLUENCE ON RUNNING. | UNNECESSARY | ~747 |
| 2016/8/18 22:25 | ALARM A | 80% | NO LOGIC SETTING. NO IMMEDIATE INFLUENCE ON RUNNING. | UNNECESSARY | ~748 |
| 2016/8/18 22:20 | ALARM A | 80% | NO GAUGE CORRECTION. NO IMMEDIATE INFLUENCE ON RUNNING. | UNNECESSARY | ~749 |
| 2016/8/18 22:15 | ALARM B | 20% | POSSIBILITY OF CRITICAL FAULT OF PUMP. CHECKING OF DEVICE STATE NECESSARY. | NECESSARY | ~750 |
| 2016/8/18 22:10 | ALARM A | 80% | NO GAUGE CORRECTION. NO IMMEDIATE INFLUENCE ON RUNNING. | UNNECESSARY | ~751 |

ACTIVATION TIME (rows 741–743)
AFTER ACTIVATION TIME (RATED TIME OR PARTIAL LOAD) (rows 744–751)

ALARM DISPLAY SYSTEM AND ALARM DISPLAY METHOD

TECHNICAL FIELD

The present invention relates to an alarm display system and an alarm display method.

Priority is claimed on Japanese Patent Application No. 2017-011983, filed Jan. 26, 2017, the content of which is incorporated herein by reference.

BACKGROUND ART

In monitoring systems of devices in a plant, countermeasures against large generation of alarms are required (for example, see Patent Document 1). In a system disclosed in Patent Document 1, reception patterns of alarm signals (alarms) against which countermeasures are necessary are registered in advance. When a sequence of alarm signals received in order matches a reception pattern, the content of an action associated with the matched reception pattern is displayed.

CITATION LIST

Patent Literature

[Patent Document 1]
Japanese Unexamined Patent Application, First Publication No. 2013-182547

SUMMARY OF INVENTION

Technical Problem

As described above, in the system disclosed in Patent Document 1, support information such as display of the content of the action is displayed in units of patterns. That is, in the system disclosed in Patent Document 1, support information is not displayed in association with all the alarm signals (hereinafter referred to as alarm information).

On the other hand, the alarm information individually has a function of notifying of the fact that a predetermined event has occurred in a predetermined device. That is, all the alarm information is meaningful. Accordingly, it is meaningful that an operator can check all the generated alarm information, that is, an operator can see all the alarm information. However, when all the alarm information is displayed and a large number of alarms are generated, there is a problem that alarms which actually have to be monitored and noticed are buried.

The present invention provides an alarm display system and an alarm display method capable of solving the above-described problems.

Solution to Problem

According to an aspect of the present invention, there is provided an alarm display system including: a database configured to store a plurality of sets of predetermined events, occurrence probabilities of the events, checking situations of the events, and countermeasure policies of the events in association with the sets; an alarm information acquisition unit configured to acquire alarm information indicating that the events occur in monitoring target devices; a support information addition unit configured to add support information for supporting determination of a countermeasure for the alarm information according to information stored in the database, to the acquired alarm information; and a display unit configured to display alarm display information in which the support information is added.

According to the aspect of the present invention, in the alarm display system, the support information addition unit may add information for designating a display state of the alarm display information by the display unit as the support information to the alarm information. The display unit may display a plurality of pieces of the alarm display information lined up chronologically.

According to the aspect of the present invention, in the alarm display system, the support information addition unit may add information indicating the countermeasure policies as the support information to the alarm information. The display unit may display a plurality of pieces of the alarm display information lined up chronologically.

According to the aspect of the present invention, in the alarm display system, the database may store the sets in accordance with running patterns of the devices.

According to the aspect of the present invention, in the alarm display system, the database may store the sets in accordance with combinations of the plurality of devices.

According to the aspect of the present invention, in the alarm display system, the database may store information regarding changes in the devices over time. The support information addition unit may add the information regarding the changes in the devices over time as the support information to the alarm information.

According to the aspect of the present invention, in the alarm display system, the countermeasure policies stored in the database may indicate necessity and non-necessity of countermeasures or importance of the countermeasures.

According to the aspect of the present invention, in the alarm display system, the support information may be determined according to the alarm information and one or a plurality of other pieces of alarm information.

According to the aspect of the present invention, in the alarm display system, the database may store an updating history of stored information. The support information addition unit may add information indicating the history as the support information to the alarm information.

According to another aspect of the present invention, there is provided an alarm display method of using a database configured to store a plurality of sets of predetermined events, occurrence probabilities of the events, checking situations of the events, and countermeasure policies of the events in association with the sets, an alarm information acquisition unit configured to acquire alarm information indicating that the events occur in monitoring target devices, and a support information addition unit configured to add support information for supporting determination of a countermeasure for the alarm information according to information stored in the database, to the acquired alarm information, to cause a display unit to display the alarm display information in which the support information is added.

Advantageous Effects of Invention

According to the foregoing alarm display system and alarm display method, even when a large number of alarms are generated, alarms which actually have to be monitored and noticed are not buried and easily understandable monitoring is possible.

BRIEF DESCRIPTION OF DRAWINGS

FIG. 2 is a diagram showing a configuration example of a database 12 shown in FIG. 1.

FIG. 4 is a diagram showing an operation example of the alarm display device 11 shown in FIG. 1.

FIG. 5 is a diagram showing another operation example of the alarm display device 11 shown in FIG. 1.

FIG. 6 is a diagram showing another configuration example of the database 12 shown in FIG. 1.

FIG. 8 is a diagram showing another operation example of the alarm display device 11 shown in FIG. 1.

DESCRIPTION OF EMBODIMENTS

First Embodiment

Hereinafter, embodiments of the present invention will be described with reference to the drawings.

Figure 1:
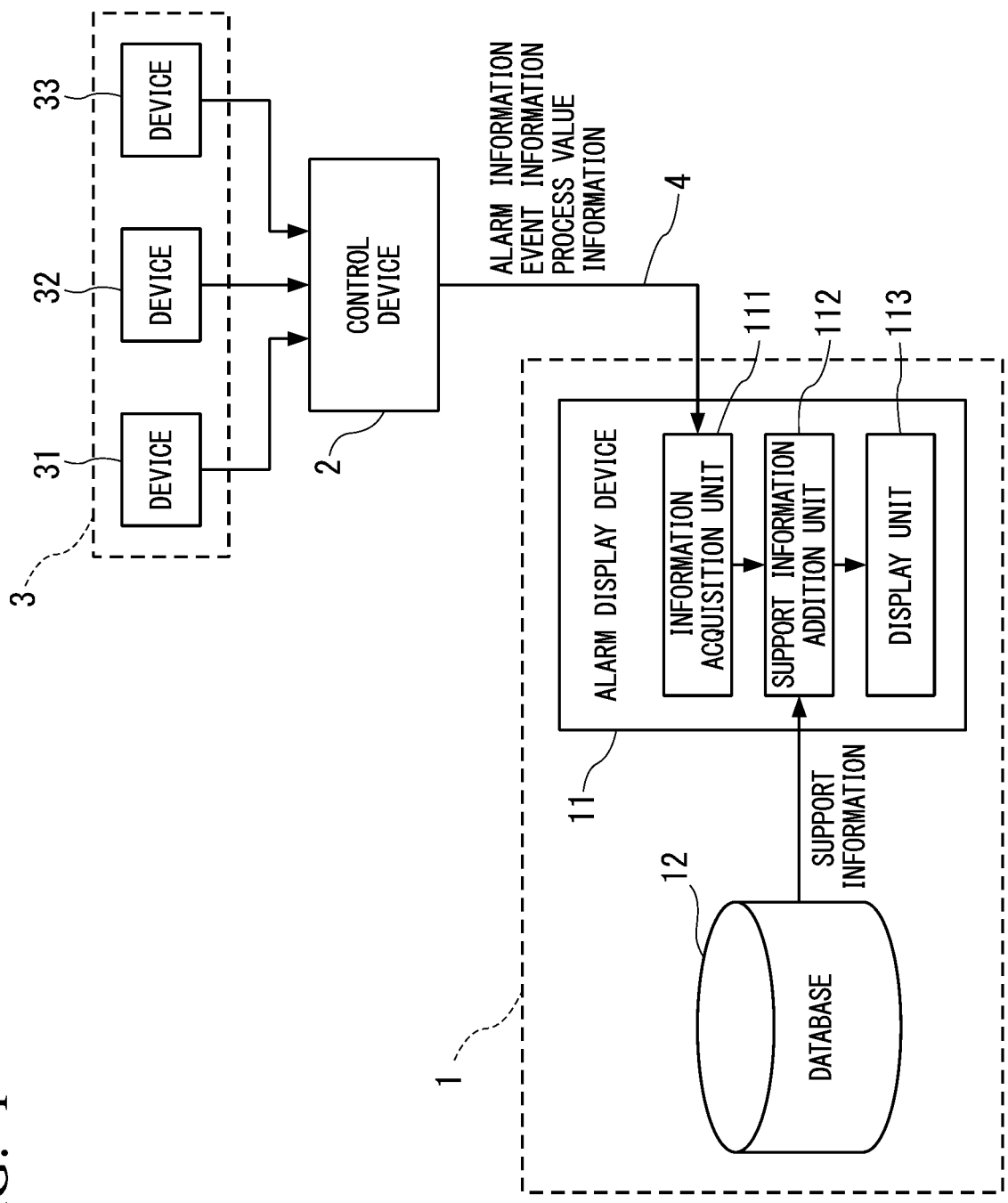
FIG. 1 is a block diagram showing a configuration example of an alarm display system according to an embodiment of the present invention.

FIG. 1 is a block diagram showing a configuration example of an alarm display system 1 according to an embodiment of the present invention.

The alarm display system 1 shown in FIG. 1 includes an alarm display device 11 and a database 12. The alarm display device 11 is, for example, a computer such as a personal computer, a tablet, or a smartphone and includes a central processing unit (CPU), an input-output device, a display device, a communication device, and a storage device. The alarm display device 11 functions as an information acquisition unit 111, a support information addition unit 112, and a display unit 113 by executing predetermined software using hardware included in the alarm display device 11. The database 12 is a database (a file or a file and a file management system) that is stored in a storage device included in the alarm display device 11 or a storage device provided outside of the alarm display device 11. The alarm display system 1 is connected to a control device 2 via a communication line 4. The communication line 4 is, for example, a communication line set in a wired or wireless local area network or a public communication network.

The control device 2 receives predetermined information from devices 31, 32, and 33 installed in the plant 3, generates alarm information, event information, and process value information (state amount information) according to the predetermined information, and transmits the alarm information, the event information, and the process value information to the alarm display system 1. The plant 3 is, for example, a facility such as a power generation facility, a production facility, or a factory facility. The devices 31, 32, and 33 are, for example, devices which are monitoring targets of the control device 2 and the alarm display system 1 and have functions of transmitting and receiving predetermined information to and from the control device 2. The devices 31, 32, and 33 include one sensor or a plurality of sensors detecting various state amounts (a temperature, a pressure, a flow rate, a speed, and the like of each unit) and transmit information indicating state amounts detected in response to a request from the control device 2 or spontaneously to the control device 2 via a wired or wireless communication line. For example, when the plant 3 is a power generation facility, the devices 31, 32, and 33 are a gas turbine, a steam turbine, a heat recovery steam generator (HRSG), and the like. Alternatively, the devices 31, 32, and 33 may be Internet of things (IoT) terminals and the like.

The alarm information is information indicating events which occur in the devices 31, 32, and 33 during running or stopping and are to be notified of according to a pre-decided standard (hereinafter referred to as relevant events). For example, the events are a predetermined temperature, pressure, flow rate, speed, and the like greater or less than a predetermined standard value in the devices 31, 32, and 33 or outside of a range of the predetermined standard value, or running shutdown, breakdown, and the like of a device among the devices 31, 32, and 33. The alarm information includes, for example, information for identifying an occurrence spot in the plant 3 or the device 31, 32, or 33 or a portion (a device, a component, or the like) of the device 31, 32, or 33 in which the relevant event occurs, information for identifying content of the relevant event, and time information indicating a date on which the relevant event occurs. In the embodiment, the alarm information includes an alarm name and time information, and the alarm name includes information for identifying an occurrence spot of the relevant event and information for identifying content.

The event information is information indicating occurrence of an event of a predetermined factor and indicates occurrence of a factor such as activation or stop of the plant 3 or the devices 31, 32, and 33 or an operation, a change in a running state, or the like of the device (hereinafter referred to as a relevant factor). The event information may be generated according to operation information input to the control device 2 or the like by an operator in addition to the predetermined information received from the device 31 or the like. The event information includes, for example, information for identifying an occurrence spot in the plant 3 or the device 31, 32, or 33, or a portion (a device, a component, or the like) of the device 31, 32, or 33 in which the relevant factor occurs, information for identifying content of the relevant factor, and time information indicating a date on which the relevant factor occurs.

The process value information (state amount information) is information indicating detection results of sensors detecting the above-described various state amounts (process values) (a temperature, a pressure, a flow rate, a speed, and the like of each unit) or a calculation result calculated by the control device 2 or the like according to detection results of the plurality of sensors. The calculation results are, for example, a ratio of a value of a current output to a rated output, running efficiency, and ratios of a temperature, a speed, a voltage, a current, and the like with respect to maximum rated values.

For example, the control device 2 generates alarm information whenever the relevant event occurs, with regard to the alarm information and transmits the generated alarm information to the alarm display system 1. For example, the control device 2 generates event information whenever the relevant factor occurs, with regard to the event information, and transmits the generated event information to the alarm display system 1. For example, when a predetermined change occurs in the process value for each predetermined period with regard to the process value information or when a request is made from the alarm display system 1, the control device 2 generates process value information and transmits the generated process value information to the alarm display system 1.

On the other hand, the database 12 is a file in which a plurality of sets of predetermined events corresponding to events indicated by the alarm information, occurrence probabilities of the events, checking situations of the events, and countermeasure policies of the events are stored in association with one another. Here, a configuration example of the database 12 will be described with reference to FIG. 2. FIG. 2 is a diagram showing the configuration example when the database 12 shown in FIG. 1 is configured as a table 121.

The table 121 shown in FIG. 2 includes a plurality of records R11, R12, R13, and the like. Each of the records R11, R12, and R13 includes fields F11, F12, F13, and F14.

The field F11 stores information indicating an alarm name. As described above, the alarm name includes information for identifying an occurrence spot of the event and information for identifying content. The field F12 stores an occurrence probability. The occurrence probability is an occurrence probability during a predetermined period of the event. The occurrence probability can be set to, for example, a previous actual value occurring during a predetermined period (or an actual value in the same kind of device) or a mathematically expected value when a period in units of hours, days, weeks, months, or years, a continuous running period per time, or the like is set as the period.

The field F13 stores information indicating a checking situation. The checking situation is information indicating knowledge about the event. The checking situation is, for example, information that is helpful for an operator to decide content of countermeasures. The checking situation is, for example, a text string that represents information indicating a cause, a result, or the like checked when the event occurred previously or information indicating seriousness or importance of the event. The field F14 stores information indicating the countermeasure policy of the event. The information indicating the countermeasure policy of the event is, for example, information indicating whether checking is necessary every time the event occurs (information regarding necessity and non-necessity to check every time).

In the example shown in FIG. 2, the field F11 is "Alarm A" of the record R11 (in this case, "alarm A" represents a text string (an alphanumeric string or the like) indicating information for identifying an occurrence spot of the event and information for identifying content), the field F12 is "80%," the field F13 is "No gauge correction. No immediate influence on running," and the field F14 is "unnecessary." The field F11 of the record R12 is "Alarm B" (which represents the same text string (an alphanumeric string or the like) as "Alarm A"), the field F12 is "20%," the field F13 is "Depends on pump state. Checking of device state necessary," and the field F14 is "necessary." The field F11 of the record R13 is "Alarm C" (which represents the same text string (an alphanumeric string or the like) as "Alarm A"), the field F12 is "20%," the field F13 is "No logic setting. No immediate influence on running," and the field F14 is "unnecessary."

Registration of data in the database 12 may be a separate calculation in another system or may depend on manual input by the operator or the like. For example, the occurrence probability can be calculated by another system and the checking situation can be input by a person.

Next, referring back to FIG. 1, each functional unit of the alarm display device 11 will be described. The information acquisition unit 111 (an alarm information acquisition unit) included in the alarm display device 11 shown in FIG. 1 acquires alarm information indicating that a predetermined event occurs in the monitoring target devices 31 to 33 and additionally acquires the event information and the process value information from the control device 2 via the communication line 4. The information acquisition unit 111 accumulates the acquired alarm information, the event information, and the process value information in a predetermined storage device (for example, a storage unit (not shown) included in the alarm display device 11).

The support information addition unit 112 adds support information for supporting determination of countermeasures against the alarm information to the alarm information acquired by the information acquisition unit 111 according to information stored in the database 12. The support information is, for example, information indicating the occurrence probability shown in FIG. 2, information indicating the checking situation, and information indicating necessity and non-necessity to check every time. The support information is, for example, information regarding a display state such as grayed-out display or highlighted display by red text. The display unit 113 displays information in which support information is added to the alarm information (which is referred to as alarm display information) on a predetermined display device. The display unit 113 may display the alarm display information on the display device included in the alarm display device 11 or may display the alarm display information on a display device of a portable terminal such as a smartphone or a mobile phone in addition to the display (or instead of the display).

Figure 3:
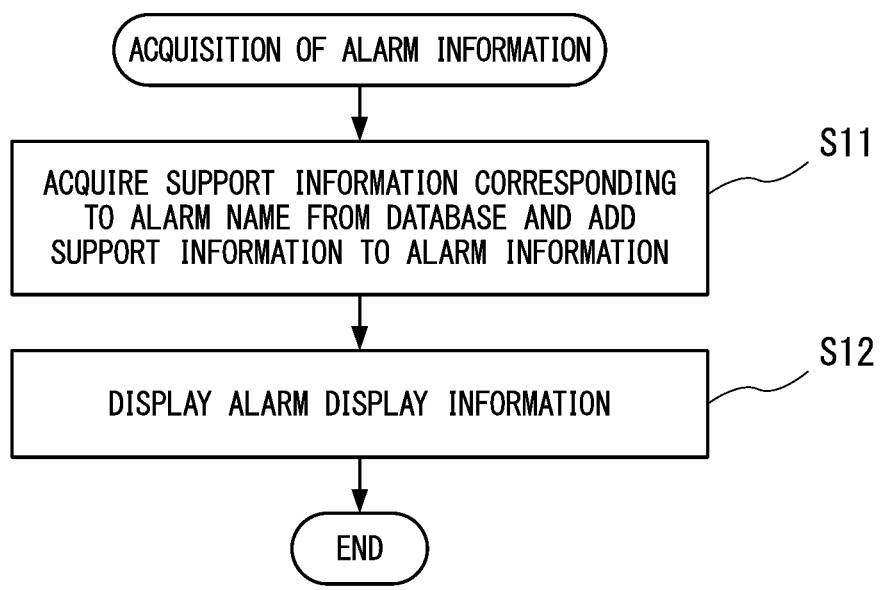
FIG. 3 is a flowchart showing an operation example of an alarm display device 11 shown in FIG. 1.

Next, an operation example of the alarm display device 11 shown in FIG. 1 will be described with reference to FIGS. 3 to 5. FIG. 3 is a flowchart showing an operation example of the alarm display device 11 shown in FIG. 1. The process shown in FIG. 3 is performed in the alarm display device 11 every time the information acquisition unit 111 acquires alarm information from the control device 2. When the information acquisition unit 111 acquires the alarm information from the control device 2, the support information addition unit 112 acquires support information corresponding to an alarm name indicated by the acquired alarm information from the database 12, adds the support information to the alarm information, and delivers the added support information to the display unit 113 (step S11). Subsequently, the display unit 113 displays alarm display information which is information in which the support information acquired in step S11 is added to the alarm information, and then the process ends (step S12).

FIG. 4 is a diagram showing a display example 7 by the display unit 113. In the display example 7, alarm display information 701 to 711 is lined up in descending chronological order and displayed. The alarm display information 701 to 711 includes an element 71 of time representing an occurrence time of the alarm information, an element 72 of an alarm name, an element 73 of an occurrence probability (corresponding to the field F12 of FIG. 2), an element 74 of a checking situation (corresponding to the field F13 of FIG. 2), and an element 75 of necessity and non-necessity to check every time (corresponding to the field F14 of FIG. 2). In the example shown in FIG. 4, the elements 71 and 72 correspond to the alarm information and the elements 73, 74, and 75 correspond to the support information.

In the display example shown in FIG. 4, for example, as four pieces of newest alarm information, alarm display information 704 corresponding to alarm information of an alarm name "Alarm C" occurring at a time "2016/8/19 22:25" (year/month/day hour:minute), alarm display information 703 corresponding to alarm information of an alarm name "Alarm B" occurring at a time "2016/8/19 23:25," alarm display information 702 corresponding to alarm information of an alarm name "Alarm A" occurring at a time "2016/8/20 00:15," and alarm display information 701 corresponding to alarm information of an alarm name "Alarm A" occurring at a time "2016/8/20 00:35" are displayed.

As described above, according to the embodiment, the display unit 113 displays each piece of alarm display information which is the information in which each piece of support information is added to all the alarm information. Accordingly, the operator can ascertain all the alarm information and easily determine alarms which actually have to be monitored and noticed according to the support information. That is, according to the embodiment, by adding the support information (in particular, the information indicating the necessity and non-necessity to check every time of the element 75), even when a large number of alarms are generated, alarms which actually have to be monitored and noticed are not buried and easily understandable monitoring is possible.

Next, another display example by the display unit 113 will be described with reference to FIG. 5. FIG. 5 is a diagram showing another operation example 7a by the display unit 113 when the information acquisition unit 111 acquires the same alarm information as that in the display example 7 shown in FIG. 4. In the display example 7a shown in FIG. 5, alarm display information 721 to 731 is lined up in descending chronological order and displayed. The alarm display information 723 and 730 is displayed in a normal display state and the alarm display information 721 and 722, 724 to 729, and 731 is displayed in a grayed-out display state (displayed in hatching in FIG. 5). The alarm display information 721 to 731 includes the element 71 of time representing an occurrence time of the alarm information, the element 72 of an alarm name, the element 73 of an occurrence probability (corresponding to the field F12 of FIG. 2), and the element 74 of a checking situation (corresponding to the field F13 of FIG. 2). In display example 7a shown in FIG. 5, information (necessity or non-necessity) corresponding to the element 75 of necessity and non-necessity to check every time (corresponding to the field F14 of FIG. 2) shown in FIG. 4 is indicated by a difference in a display state of the alarm display information. That is, the alarm display information 723 and 730 in which information corresponding to the element 75 of necessity and non-necessity to check every time (corresponding to the field F14 of FIG. 2) shown in FIG. 4 is "necessary" is displayed in the normal display state. On the other hand, the alarm display information 721 and 722, 724 to 729, and 731 in which information corresponding to the element 75 of necessity and non-necessity to check every time (corresponding to the field F14 of FIG. 2) shown in FIG. 4 is "unnecessary" is displayed in the grayed-out display state. In the example shown in FIG. 5, the elements 71 and 72 correspond to the alarm information, a difference in a display state, the elements 73 and 74 (whether the alarm display information is grayed out) corresponds to the support information.

In the display example 7a shown in FIG. 5, the operator can ascertain all the alarm information and easily determine alarms which actually have to be monitored and noticed according to the support information added as the difference in the display state.

The difference in the display state can be set alone or in combination with, for example, a difference in text color, a difference in text luminance, blinking or non-blinking, a difference in font, and a difference in text boldness in addition to being grayed-out or not.

As described above, according to the embodiment, for example, by clarifying measurement determination (for example, importance determination) of a currently occurring alarm as the support information according to previous alarm information, countermeasures against the alarm can be taken quickly. For example, by retaining support information such as a previously occurring alarm and determination, a countermeasure, and knowledge of the alarm in the database 12, it is possible to display a previous occurrence probability and previously judged knowledge with regard to an alarm occurring at the time of monitoring and, for example, by graying out elements for which monitoring is unnecessary, the understandability of the monitoring can be improved. Accordingly, according to the embodiment, the alarms which have to be noticed become obvious through specification of the alarms which have to be monitored, and easily understandable monitoring is possible. Thus, it is possible to contribute to an improvement in a plant operation rate.

In the display example 7a shown in FIG. 5, as in the display example 7 of FIG. 4, the element 75 of the necessity and non-necessity to check every time may be configured to be displayed. The display example 7 of FIG. 4 and the display example 7a of FIG. 5 may be configured to be switched and displayed through an operation by the operator.

Second Embodiment

Figure 7:
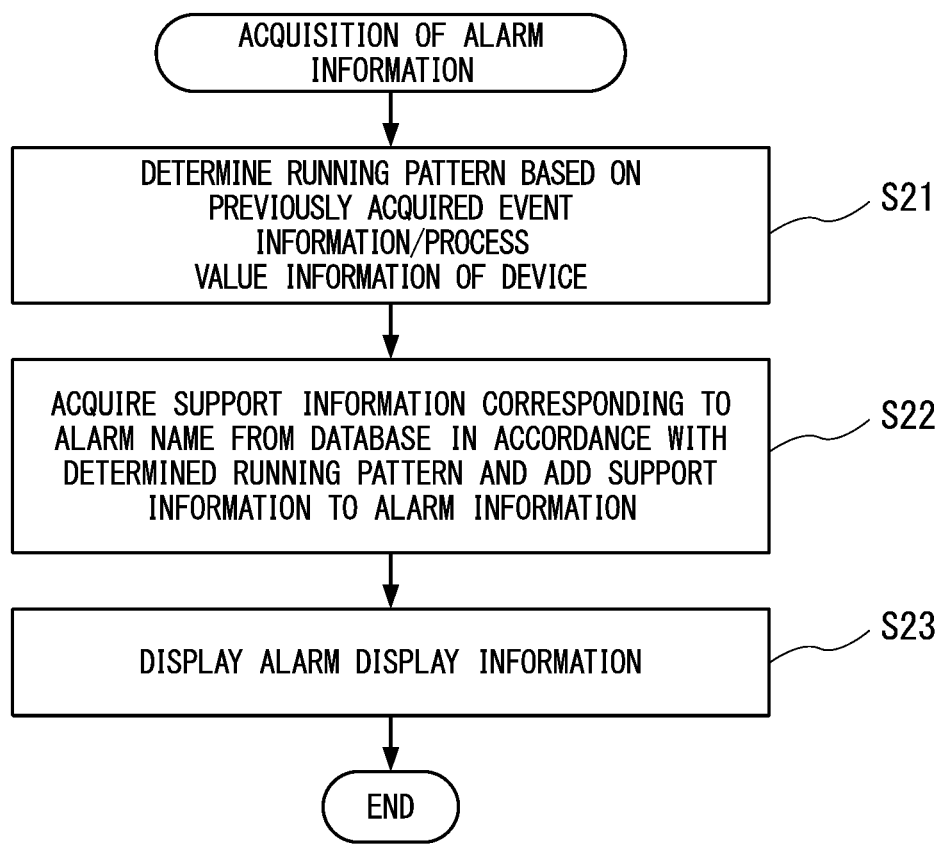
FIG. 7 is a flowchart showing another operation example of the alarm display device 11 shown in FIG. 1.

Next, another embodiment of the present invention will be described with reference to FIGS. 6 to 8. FIG. 6 is a diagram showing a configuration example of the database 12 shown in FIG. 1 according to a second embodiment. FIG. 7 is a flowchart showing an operation example of the alarm display device 11 shown in FIG. 1 according to the second embodiment. FIG. 8 is a diagram showing an operation example of the alarm display device 11 shown in FIG. 1 according to the second embodiment.

In the embodiment, in the database 12, when the plurality of sets of the predetermined events corresponding to the events indicated by the alarm information, the occurrence probabilities of the events, the checking situations of the events, and the countermeasure policies of the events are stored in association with each other to be stored, the plurality of sets are stored in accordance with running patterns of the devices 31, 32, and 33. For example, when the plant 3 is a power generation plant and the device 31 is a gas turbine, running patterns can be classified into an activation time, a partial load running time, a rated operation time, a stopping time, and the like of the gas turbine. FIG. 6 is a diagram showing a configuration example of the database 12 shown in FIG. 1. In the embodiment, the database 12 shown in FIG. 1 includes a table 122 shown in FIG. 6(*a*) and a table 123 shown in FIG. 6(*b*). The table 122 shown in FIG. 6(*a*) includes support information applied at the activation time of the devices 31, 32, and 33. The table 123 shown in FIG. 6(*b*) includes support information applied after the activation time (for example, the rated running time) of the devices 31, 32, and 33. Records R11, R12, R13, and the like of the table 122 shown in FIG. 6(*a*) and records R11, R12, R13, and the like of the table 123 shown in FIG. 6(*b*) have the same configuration as the records R11, R12, R13, and the like of the table 121 described with reference to FIG. 2. That is, kinds of information stored in the fields F11, F12, F13, and F14 are the same. Here, the content of the information stored in the fields F11, F12, F13, and F14 are different in accordance with running patterns in some cases.

For example, for the alarm name "Alarm A," setting content is the same in the table 122 applied at the activation time and the table 123 applied after the activation time. On the other hand, for the alarm name "Alarm B," an occurrence probability "30%," a checking situation "Possibility of manual operation of pump," and the necessity and non-necessity to check every time "necessary" are set in the table 122 applied at the activation time. In the table 123 applied at the rated operation time after the activation time, on the other hand, an occurrence probability "20%," a checking situation "Possibility of critical fault of pump. Checking of device state necessary," and the necessity and non-necessity to check every time "necessary" are set. For the alarm name "Alarm C," an occurrence probability "40%" and a checking situation "No logic setting. No immediate influence on running," and the necessity and non-necessity to check every time "necessary" are set in the table 122 applied at the activation time. In the table 123 applied after the activation time, on the other hand, an occurrence probability "20%," a checking situation "Possibility of fault of device," and the necessity and non-necessity to check every time "necessary" are set.

Next, an operation example of the alarm display device 11 according to the embodiment will be described with reference to FIG. 7. FIG. 7 is a flowchart showing an operation example of the alarm display device 11 shown in FIG. 1 according to the second embodiment. A process shown in FIG. 7 is performed in the alarm display device 11 every time when the information acquisition unit 111 acquires alarm information from the control device 2. When the information acquisition unit 111 acquires the alarm information from the control device 2, the support information addition unit 112 determines a running pattern according to the previously acquired event information or the process value information of the device (at the activation time or after the activation) (step S21). For example, when event information indicating activation of the device 31 (gas turbine) is previously acquired and an output value of the gas turbine included in the received process value indicates a tendency to increase less than 50% of a rated output, the support information addition unit 112 determines that the running pattern of the device 31 is the activation time. For example, when event information indicating activation of the device 31 is acquired, a predetermined time elapses from a time indicated by the event information, and the output value of the gas turbine included in the process value received for the predetermined time by which it goes further back from the current time is equal to or greater than 50% and less than 100% of the rated output, the support information addition unit 112 determines that the running pattern of the device 31 is the partial load time. When the output value of the gas turbine indicates the rated output value, the support information addition unit 112 determines that the running pattern of the device 31 is the rated operation time.

Subsequently, the support information addition unit 112 acquires support information corresponding to the alarm name from the database 12 in accordance with the running pattern determined in step S21, adds the support information to the alarm information, and delivers the added the support information to the display unit 113 (step S22). For example, the support information addition unit 112 acquires the support information from the table 122 when the running pattern is the activation time, and acquires the support information from the table 123 when the running pattern is the rated running time after the activation time.

Subsequently, the display unit 113 displays the alarm display information which is information in which the support information acquired in step S22 is added to the alarm information and ends the process (step S23).

FIG. 8 is a diagram showing display example 70 by the display unit 113. In display example 70, pieces of alarm display information 741 to 751 are displayed to be lined up in a chronological descending order. The pieces of alarm display information 741 to 751 include the element 71 of a time representing an occurrence time of the alarm information, the element 72 of an alarm name, the element 73 of an occurrence probability (corresponding to the field F12 of FIG. 6(*a*) or 6(*b*)), the element 74 of a checking situation (corresponding to the field F13 of FIG. 6(*a*) or 6(*b*)), and the element 75 of the necessity and non-necessity to check every time (corresponding to the field F14 of FIG. 6(*a*) or 6(*b*)). In the example shown in FIG. 8, the elements 71 and 72 correspond to the alarm information and a difference in a display state from the elements 73, 74, and 75 (whether the alarm display information is grayed out) correspond to the support information.

That is, the display example 70 shown in FIG. 8, the pieces of alarm display information 743, 744, 746, and 750 are displayed in the normal display state and the pieces of alarm display information 741, 742, 745, 747 to 749, and 751 are displayed in the gray-out display state (displayed in hatching in FIG. 8). In the display example 70 of FIG. 8, the pieces of alarm display information 743, 744, 746, and 750 in which the element 75 of the necessity and non-necessity to check every time is "necessary" are displayed in the normal display state. On the other hand, the pieces of alarm display information 741, 742, 745, 747 to 749, and 751 in which the element 75 of the necessity and non-necessity to check every time is "unnecessary" are displayed in the gray-out display state. In the example shown in FIG. 8, the elements 71 and 72 correspond to the alarm information and the difference in a display state from the elements 73, 74, and 75 (whether the alarm display information is grayed out) corresponds to the support information.

In the display example 70 shown in FIG. 8, alarm information occurring after a time "2016/8/19 22:20" (year/month/day hour:minute) is alarm information occurring when the running pattern is "activation time," and alarm information occurring before a time "2016/8/19 22:15" is alarm information occurring when the running pattern is "after the activation time." That is, display example 70 corresponds to a case in which during running of the devices 31, 32, and 33, the running of the devices 31, 32, and 33 is stopped in response to an instruction by the operator according to, for example, the alarm information occurring at the time "2016/8/19 22:15," and then the devices 31, 32, and 33 are reactivated before the time "2016/8/19 22:20."

As described above, according to the embodiment, as in the first embodiment, the display unit 113 displays each piece of alarm display information which is the information in which each piece of support information is added to all the alarm information. Accordingly, the operator can ascertain all the alarm information and easily determine alarms which actually have to be monitored and noticed according to the support information. That is, according to the embodiment, by adding the support information, even when a large number of alarms are generated, alarms which have to be actually monitored and noticed are not buried and easily understandable monitoring is possible.

Further, according to the embodiment, by considering the running patterns at the time of database of previous alarms, it is possible to improve quality of measurement determination. That is, in the second embodiment, the alarm information is retained for each running pattern in addition to the configuration of the first embodiment. The running patterns are not limited to the activation time and the times after the activation (the times other than the activation) and any pattern may be set in accordance with characteristics of each running pattern of the devices. Thus, it is possible to categorizing alarms occurring in each running pattern, determining running patterns for alarms occurring in an actual plant, and output alarm information corresponding to the running patterns. Similarly, even for the activation time, the running pattern may also be classified into a hot start (for example, a stop time is within 8 hours), a warm start (for example, the stop time is within 24 hours), and a cold start (for example, the stop time exceeds 24 hours) in accordance with the stopping time before the activation. The running state is determined from the event information or the process value information. That is, by picking up appropriate information in accordance with a running pattern, it is possible to more accurately determine a status or an occurrence probability of the alarm. For example, in the example shown in FIG. 6, a difference in an occurrence frequency or a difference in a point to be seen can be added, such as a high possibility of a manual operation at the time of notification even in the same alarm of the alarm B during activation, but a high possibility of a critical fault after the activation. In this way, according to the embodiment, it is possible to present the alarm display information with higher precision.

In the display example 70 of FIG. 8, a field for displaying the running patterns may be added and displayed.

As described above, according to each embodiment of the present invention, by clarifying the information regarding the necessity and non-necessity to check or countermeasure situations to guide the operator with reference to database information in which previously occurred alarms are summarized with regard to occurred alarms, it is possible to improve the quality of monitoring and achieve quick initial responses.

Embodiments of the present invention are not limited to the foregoing embodiments. For example, a modification can be made as follows.

For example, in the foregoing embodiments, the support information addition unit 112 adds the information (whether gray-out or not) for designating the display state of the alarm display information by the display unit 113 as the support information to the alarm information with regard to the information (the information indicating the necessity and non-necessity to check every time) indicating the countermeasure policies and the display unit 113 displays the plurality of pieces of alarm display information lined up chronologically. For example, information for designating the information regarding the occurrence probabilities to be displayed in different display states in accordance with the occurrence probabilities can also be added as the support information (for example, an increase in the occurrence probability is displayed to be grayed out).

The database 12 may be configured in accordance with a combination of a plurality of devices. For example, when one stream turbine is configured to be driven with two gas turbines (devices A and B) in a gas turbine combined cycle (GTCC) plant, the database 12 can include a table corresponding to combinations of devices activating both the devices A and B and a table corresponding to combinations of devices activating one of the devices A and B. Alternatively, a field indicating the combinations of the devices to a record included in the table may be added for correspondence.

The database 12 may store information regarding a change in a device over time and the support information addition unit 112 may add the information regarding a change in a device over time as support information to the alarm information. In this case, for example, an item indicating an occurrence probability before a predetermined period or an increase ratio of an occurrence probability may be added to the alarm display information or an item indicating activation years or a design lifetime of a device may be added to the alarm display information.

The countermeasure policies stored in the database 12 can be set as information indicating the necessity or non-necessity of a countermeasure or importance or urgency of the countermeasure. That is, the countermeasure policies can indicate importance of five levels instead of or along with the necessity or non-necessity of the countermeasure. In this case, for example, checking is absolutely necessary at level 5 which is the utmost importance and checking is preferable at levels 3 and 4. A text color may be classified into a plurality of colors in accordance with the necessity and non-necessity of a countermeasure or importance. Alternatively, urgency of countermeasures is indicated at five levels. When urgency is 5, a countermeasure may be decided to be taken within a predetermined time.

The support information may be determined according to the alarm information and one piece or a plurality of pieces of other alarm information. For example, the necessity and non-necessity to check every time is not necessary when Alarm A occurs alone. However, when Alarm A occurs after occurrence of Alarm B or Alarm C (or after Alarm B occurs and subsequently Alarm C occurs), the necessity and non-necessity to check every time of Alarm A can be necessary. By storing such determination standards in the database 12 and adding a determination process by a determination unit using the stored determination standards, it is possible to correspond to this modification.

The database 12 may store an updating history of the stored information and the support information addition unit 112 may add information indicating the history as support information to the alarm information. For example, when the content of the field F13 of the checking situation of the table 121 shown in FIG. 2 is updated, the information before the updating is stored along with information regarding an updating date. Then, for example, when display information of the element 74 of the checking situation shown in FIG. 4 is selected, previously registered content can be displayed as history information. For example, it is possible to display a history of countermeasure policies (a countermeasure is necessary previously and is not necessary currently) for a situation in which an event is checked (an immediate countermeasure is not necessary previously, but it is currently checked that XX is equal to or less than a threshold).

INDUSTRIAL APPLICABILITY

According to the foregoing alarm display system and alarm display method, even when a large number of alarms are generated, alarms which actually have to be monitored and noticed are not buried and easily understandable monitoring is possible.

REFERENCE SIGNS LIST

1 Alarm display system
2 Control device
3 Plant
4 Communication line
11 Alarm display device
12 Database
31, 32, 33 Device
111 Information acquisition unit
112 Support information addition unit
113 Display unit

What is claimed is:
1. An alarm display system comprising:
a database configured to store a plurality of sets of predetermined events, occurrence probabilities of the events, checking situations of the events, and countermeasure policies of the events in association with the sets;

an alarm information acquisition unit configured to acquire alarm information indicating that the events occur in monitoring target devices;

a support information addition unit configured to add support information for supporting determination of a countermeasure for the alarm information according to information stored in the database, to the acquired alarm information; and a display unit configured to display a plurality of pieces of alarm display information in which the support information is added on a same screen, wherein the support information addition unit is configured to designate display states of the plurality of pieces of alarm display information in accordance with information indicating necessity and non-necessity of countermeasures or importance of the countermeasures included in the countermeasure policies.

2. The alarm display system according to claim 1, wherein the support information addition unit is configured to add information for designating a display state of the alarm display information by the display unit as the support information to the alarm information, and wherein the display unit is configured to display a plurality of pieces of the alarm display information lined up chronologically.

3. The alarm display system according to claim 1, wherein the support information addition unit is configured to add information indicating the countermeasure policies as the support information to the alarm information, and wherein the display unit displays a plurality of pieces of the alarm display information lined up chronologically.

4. The alarm display system according to claim 1, wherein the database is configured to store the sets in accordance with running patterns of the devices.

5. The alarm display system according to claim 1, wherein the database is configured to store the sets in accordance with combinations of the plurality of devices.

6. The alarm display system according to claim 1, wherein the database is configured to store information regarding changes in the devices over time, and wherein the support information addition unit is configured to add the information regarding the changes in the devices over time as the support information to the alarm information.

7. The alarm display system according to claim 1, wherein the countermeasure policies stored in the database indicate necessity and non-necessity of countermeasures or importance of the countermeasures.

8. The alarm display system according to claim 1, wherein the support information is determined according to the alarm information and one or a plurality of other pieces of alarm information.

9. The alarm display system according to claim 1, wherein the database is configured to store an updating history of stored information, and wherein the support information addition unit is configured to add information indicating the history as the support information to the alarm information.

10. An alarm display method of using a database configured to store a plurality of sets of predetermined events, occurrence probabilities of the events, checking situations of the events, and countermeasure policies of the events in association with the sets, an alarm information acquisition unit configured to acquire alarm information indicating that the events occur in monitoring target devices, and a support information addition unit configured to add support information for supporting determination of a countermeasure for the alarm information according to information stored in the database, to the acquired alarm information, to cause the support information addition unit to designate display states of the plurality of pieces of alarm display information in accordance with information indicating necessity and non-necessity of countermeasures or importance of the countermeasures included in the countermeasure policies, and to cause a display unit to display a plurality of pieces of the alarm display information in which the support information is added on a same screen.

* * * * *